United States Patent Office 3,592,673
Patented July 13, 1971

3,592,673
PROCESS FOR MAKING CERAMIC
COLORING MATERIALS
Erich Ruf, Essen, Germany, assignor to
Th. Goldschmidt A.G., Essen, Germany
No Drawing. Filed Jan. 16, 1968, Ser. No. 698,161
Int. Cl. C08h 17/04; C09c 1/00
U.S. Cl. 106—288B                                    5 Claims

ABSTRACT OF THE DISCLOSURE

This invention relates to a process for preparing tin-containing ceramic coloring material, which process comprises calcining, at a temperature of about 800 to 1400° C., a mixture of stannous oxide and a tungsten-containing or molybdenum-containing compound.

---

This invention relates to a process for preparing tin-containing ceramic coloring materials for cover glazes.

Ceramic coloring materials generally comprise a color carrier having opacifying properties and additionally may contain oxidic compounds together with additional opacifying agents, if desired. Cover glazes having different shades may be made by incorporating coloring materials. It is generally required of ceramic coloring materials that intensive colorations be obtained with the use of a small content of color-imparting compounds.

With the aid of known coloring materials or color-imparting compounds, it is possible to produce a large number of shades. On the other hand, the problem of making gray coloring materials which are unaffected by temperature changes has not been satisfactorily solved as yet.

Surprisingly, it now has been found that a ceramic coloring material which satisfies the requirements of the trade to an exceptional extent may be obtained by mixing stannous oxide with tungsten and/or molybdenum-containing compounds and, if desired, with silicic acid, after which the mixture is calcined at a temperature in the range of about 800 to 1400° C. The color intensity of the cover glazes which are prepared with the use of the coloring materials varies in dependence upon the concentration of the individual components of the mixture.

In contrast, when calcining a mixture of tin dioxide and zirconium oxide or tin dioxide and zirconium silicate, or tin oxide and titanium dioxide, together with a tungsten and/or molybdenum-containing compound, one obtains, even in the presence of silicic acid, only white pigments. When calcining titanium dioxide with compounds containing molybdenum, eggshell-colored pigments are obtained which, after being incorporated into colorless glaze, produce white cover glazes or faintly eggshell-colored cover glazes.

It also is possible to add to the mixture, prior to calcination, other known ceramic coloring materials in order to influence the color or other properties of the coloring material of the invention.

It also is possible to add to the mixture, prior to calcination, compounds which form color oxides during the calcination, at the latest. This also will result in mixed-color cover glazes, and the ceramic coloring materials have a high color intensity.

The presence of silicic acid in the mixture to be calcined is not absolutely mandatory. Small percentages of silicic acid in the mixture to be calcined are intended merely to ensure a good incorporation and compatibility in suitable glazes of the coloring material obtained after calcination.

The content of stannous oxide in the calcination mixtures should be between about 50 and 90 percent by weight, preferably between 60 and 85 percent by weight of SnO. The contents in the mixtures to be calcined of tungstic acid and/or molybdic acid, or of the tungsten-containing and/or molybdenum-containing compound, expressed as tungstic acid or molybdenum oxide, respectively, from an economic point of view, should amount to from 2 to 15 percent by weight of $H_2WO_4$ or $MoO_3$, preferably 2 to 10 percent by weight of tungstic acid and/or molybdenum oxide.

A particular advantage of the process of the present invention is that known compounds, such as tin dioxide, zirconium oxide, zirconium silicate, and titanium dioxide, may be added to the mixtures to be calcined either singly or in admixture as color carriers and as opacifying agents. In this regard, the addition of zirconium oxide to mixtures of stannous oxide and a tungsten-containing and/or molybdenum-containing compound, if desired in the presence of silicic acid, has been found to be particularly favorable and economical in view of the color of the coloring material and of the glaze, as well as the quality of the glaze after the incorporation of the coloring material, particularly if the coloring material is blended into glazes having a good zirconium bond and good zirconium compatibility.

The calcination of mixtures of stannous oxide and tungsten-containing and/or molybdenum-containing compounds, if desired in the presence of silicic acid, should be performed within a temperature range of about 800 to 1400° C., preferably between 950 and 1100° C. The mixtures generally are maintained at such temperatures for about one hour.

When calcining a calcination mixture containing molybdic acid and based on stannous oxide, it is impossible to avoid volatilization of molybdenum oxide. When preparing molybdenum-containing coloring materials according to the process of the invention, it is preferable therefore to start with non-volatile molybdenum-containing compounds, such as, for example, Cer-IV-molybdate, at a weight ratio of Ce:Mo of 1:1. Furthermore, it is advisable for calcination mixtures containing molybdic acid or molybdenum oxide, to employ an excess of zirconium oxide relative to molybdenum oxide in order to reduce the volatility of the molybdenum oxide. An inert gaseous atmosphere is not required for calcining the calcination mixtures. During the calcination in a nitrogen atmosphere at a molybdenum-containing calcination mixture with a stannous oxide base and containing silicic acid, if desired, a deepening of the color of the coloring material may be observed as compared to that obtained when the calcination is performed in normal atmospheric air.

The formation of the coloring materials which are obtained according to the process of the invention probably is due to oxidation and reduction reactions within the calcination mixture. At that time, stannous oxide probably is oxidized to tin dioxide during calcining. At the same time, tungsten-containing and/or molybdenum-containing compounds presumably are reduced to gray and multi-colored degrees of valence, respectively, which are simultaneously bonded to tin dioxide. Debye-Scherrer diagrams of uniformly ground mixtures of stannous oxide, tungsten-containing and/or molybdenum-containing compounds, and silicic acid show, immediately after wet grinding and drying at 105° C., diffraction lines for the individual compounds contained in the mixture, such as stannous oxide, tungstic acid or molybdic acid and silicic acid. After the calcination of these calcination mixtures, only diffraction lines of tin dioxide and silicic acid, but not of tungstic acid and/or molybdenum oxide are produced in the Debye-Scherrer diagram. The diffraction lines of tin dioxide which are obtained by such calcination mixtures after calcining correspond in the intensity thereof approximately to those which are obtained solely from the calcination of stannous oxide; i.e., after the conversion thereof into tin dioxide. It thus may be concluded that stannous oxide is oxidized to tin dioxide practically quantitatively, whereas molybdenum-containing and tungsten-containing compounds will no longer be present, after calcination, in the original degree of valence. The difference in the solubility of pure stannous oxide in hot concentrated sulfuric acid, on the one hand, and the coloring materials prepared according to the process of the present invention, on the other hand, suggests that these coloring materials consist of tin dioxide and of tungsten and molybdenum of lower degrees of valence combined with the tin oxide.

The process of the present invention will be further illustrated by reference to the following specific examples:

EXAMPLE 1

42.5 grams of stannous oxide (SnO), 5 grams of molybdenum oxide ($MoO_3$), and 2.5 grams of silicic acid, in the form of quartz, are ground in a mortar, initially in the dry condition, until a homogeneous mixture is obtained. After the addition of about 15 ml. of water, the mixture is again wet-ground and, thereafter, dried at 105° C. for about 3 to 4 hours. The dry mixture is then ground once more and calcined in a crucible, which is stable at red heat, for one hour at 1040° C. A gray color pigment is obtained.

After this gray coloring material has been incorporated into a colorless glaze in known manner, there is obtained, after burning the glaze at approximately 1040° C., a gray-colored covering glaze.

Comparative test

If, in the mixture described above, stannous oxide is replaced by tin dioxide or zirconium oxide, or by mixture of tin dioxide, zirconium oxide, and titanium dioxide, while subsequent procedure is analogous to that described in Example 1, a white pigment is obtained which, after blending into a colorless glaze, produces a white covering glaze.

EXAMPLE 2

45 grams of stannous oxide, 2.5 grams of tungstic acid ($H_2WO_4$) and 2.5 grams of silicic acid, in the form of quartz, are mixed, dried, and calcined at 1040° C. for one hour in accordance with the procedure described in Example 1 above. There is obtained a color pigment which is colored from medium to dark gray and which, after blending into a colorless glaze, produces a medium to dark gray cover glaze.

Comparative test

If, in the mixture described in Example 2 above, stannous oxide is replaced by tin dioxide or zirconium oxide, or titanium dioxide, a white pigment is obtained after an analogous treatment which pigment, after blending into a colorless glaze, produces a white covering glaze.

EXAMPLE 3

32.5 grams of stannous oxide, 5 grams of molybdenum oxide, 5 grams of silicic acid, and 7.5 grams of tin dioxide ($SnO_2$) are pulverized and ground to a homogeneous mixture according to the procedure described in Example 1 above, after which the mixture is dried and calcined at 1040° C. for one hour. There is obtained a green-gray coloring material which, after blending into a colorless glaze, produces a gray-green covering glaze.

EXAMPLE 4

40 grams of stannous oxide, 1.25 grams of tungstic acid, 2.5 grams of silicic acid, and 6.25 grams of zirconium oxide are pulverized and ground in the dry and in the wet condition as described in Example 1 above and then dried and calcined at 1040° C. for one hour. There is obtained a medium gray coloring material which, after blending into a colorless glaze, produces a beautiful dark-gray covering glaze.

EXAMPLE 5

35 grams of stannous oxide, 5 grams of titanium dioxide ($TiO_2$), 5 grams of molybdenum oxide, and 5 grams of silicic acid, in the form of quartz, are ground in the dry and wet condition according to the procedure described in Example 1 and then dried and calcined at 1040° C. for one hour. There is obtained a medium-gray coloring material which, after blending into a colorless glaze, produces a blue-gray covering glaze.

Comparative test

If, in the mixture described in Example 5, stannous oxide is replaced by titanium dioxide and treated in an analogous manner, an eggshell-colored pigment is obtained which, after blending into a colorless glaze, produces an eggshell-colored covering glaze.

EXAMPLE 6

40 grams of stannous oxide, 2.5 grams of molybdenum oxide, 2.5 grams of tungstic acid, 2.5 grams of silicic acid, in the form of quartz, and 2.5 grams of tin dioxide are ground in the dry and in the wet condition as described in Example 1 above, and then dried and calcined at 1040° C. for one hour. There is obtained a gray coloring material which, after blending into a colorless glaze, produces a dark-gray-colored covering glaze.

EXAMPLE 7

40 grams of stannous oxide, 6.25 grams of zirconium oxide, 1.25 grams of tungstic acid, 2.5 grams of silicic acid, in the form of quartz, and 3 grams of ammonium-meta-vanadate ($NH_4VO_3$) are ground in the dry and wet condition as described in Example 1 above and then dried and calcined at 1040° C. for one hour. There is obtained a brown-colored pigment which, after blending into a colorless glaze, produces a yellow-green covering glaze.

It will be obvious to those skilled in the art that many modifications may be made within the scope of the present invention without departing from the spirit thereof, and the invention includes all such modifications.

What is claimed is:

1. A tin-containing ceramic coloring material prepared by calcining, at a temperature in the range of about 800 to 1400° C., a mixture containing about 50 to 90 percent by weight of stannous oxide, about 2 to 15 percent by weight of a compound selected from the group consisting of a tungsten oxide-containing or molybdenum oxide-containing compound, and the remainder being at least one compound selected from the group consisting of $SiO_2$, $SnO_2$, $ZrO_2$, $ZrSiO_4$, $TiO_2$, and $NH_4VO_3$.

2. A process according to claim 1 in which the mixture includes a silicon dioxide-containing material.

3. A process according to claim 2 in which the silicon dioxide-containing material is silicon dioxide.

4. A process according to claim 1 in which the mixture includes a ceramic coloring material.

5. A process according to claim 1 in which the mixture includes a compound which forms a color oxide during calcination.

References Cited

UNITED STATES PATENTS 3,022,186   2/1962   Hund _____ 106—288I

FOREIGN PATENTS 379,572   9/1932   Great Britain _____ 106—288I

OTHER REFERENCES

Mellor, Comprehensive Treatise on Inorganic and Theoretical Chemistry, vol. 7, p. 388.

JAMES E. POER, Primary Examiner

U.S. Cl. X.R.

106—299, 309